(12) United States Patent
Montua

(10) Patent No.: US 11,613,283 B2
(45) Date of Patent: Mar. 28, 2023

(54) RUNNING GEAR FOR A VEHICLE, AND BEARING ELEMENT FOR A RUNNING GEAR

(71) Applicant: Faiveley Transport Witten GmbH, Witten (DE)

(72) Inventor: Sebastian Montua, Fuldatal (DE)

(73) Assignee: FAIVELEY TRANSPORT WITTEN GMBH, Witten (DE)

( * ) Notice: Subject to any disclaimer, the term of this patent is extended or adjusted under 35 U.S.C. 154(b) by 882 days.

(21) Appl. No.: 16/481,977

(22) PCT Filed: Jan. 15, 2018

(86) PCT No.: PCT/EP2018/050873
§ 371 (c)(1),
(2) Date: Jul. 30, 2019

(87) PCT Pub. No.: WO2018/141538
PCT Pub. Date: Aug. 9, 2018

(65) Prior Publication Data
US 2019/0389496 A1 Dec. 26, 2019

(30) Foreign Application Priority Data
Feb. 2, 2017 (DE) ...................... 20 2017 100 568.2

(51) Int. Cl.
*B61H 13/38* (2006.01)
*B61F 5/50* (2006.01)
(Continued)

(52) U.S. Cl.
CPC ............... *B61H 13/38* (2013.01); *B61F 5/50* (2013.01); *F16D 55/2245* (2013.01);
(Continued)

(58) Field of Classification Search
CPC .................................. B61H 1/00; B61H 13/38
See application file for complete search history.

(56) References Cited

U.S. PATENT DOCUMENTS 2,861,654 A 11/1958 Dean
3,431,751 A * 3/1969 Stokely ................... F16D 3/265
464/106
(Continued)

FOREIGN PATENT DOCUMENTS

AT 502800 B1 * 6/2007 ................ B61F 5/24
CN 1795119 A 6/2006
(Continued)

OTHER PUBLICATIONS

The Notice of Acceptance received for related Australian Patent Application No. 2018215129 dated Mar. 2, 2021 (4 pages).
(Continued)

*Primary Examiner* — Melanie Torres Williams
(74) *Attorney, Agent, or Firm* — The Small Patent Law Group LLC; Christopher R. Carroll

(57) ABSTRACT

The aim of the invention is to provide a running gear with a mount for a brake linkage on a bogie, wherein the mount has a long service life and requires little maintenance. The transmission of shocks and vibrations between the brake linkage and the bogie is reduced, and the bogie and the brake linkage are electrically insulated from each other. A running gear for a rail vehicle including a bogie and a brake linkage is proposed, having at least one bearing element. The brake linkage is mounted on the bogie and/or is connected to the bogie by means of the at least one bearing element, and the at least one bearing element has a plastic and/or consists of a plastic.

18 Claims, 3 Drawing Sheets

(51) Int. Cl.
  *F16D 55/224* (2006.01)
  *F16D 65/00* (2006.01)
  *B61H 1/00* (2006.01)
  *F16D 55/00* (2006.01)
  *F16D 125/64* (2012.01)

(52) U.S. Cl.
  CPC .......... *F16D 65/0056* (2013.01); *B61H 1/00* (2013.01); *F16D 2055/0008* (2013.01); *F16D 2125/64* (2013.01)

(56) References Cited

U.S. PATENT DOCUMENTS

| | | | |
|---|---|---|---|
| 4,168,666 | A | 9/1979 | Gage |
| 5,286,014 | A | 2/1994 | Chakko |
| 6,792,874 | B1 | 9/2004 | Anderson et al. |
| 8,496,381 | B2 | 7/2013 | Hunter et al. |
| 2015/0298732 | A1 | 10/2015 | Cao et al. |

FOREIGN PATENT DOCUMENTS

| | | | | |
|---|---|---|---|---|
| CN | 101978184 | A | | 2/2011 |
| CN | 102167052 | A | | 8/2011 |
| CN | 104395177 | A | | 3/2015 |
| CN | 205365626 | U | | 7/2016 |
| CN | 205769308 | U | | 12/2016 |
| DE | 11 55 253 | B | | 10/1963 |
| DE | 1155253 | B | | 10/1963 |
| DE | 4425598 | C1 | | 12/1995 |
| DE | 198 44 507 | A1 | | 3/2000 |
| DE | 10241755 | A1 | | 3/2004 |
| EP | 0216594 | A2 * | | 1/1987 |
| EP | 0306851 | A2 * | | 3/1989 |
| EP | 2386454 | A1 * | 11/2011 | .............. B61F 5/122 |
| EP | 2 940 339 | A1 | | 11/2015 |
| RU | 2540572 | C2 | | 2/2015 |
| RU | 2541580 | C1 | | 2/2015 |
| WO | 2010/046174 | A1 | | 4/2010 |
| WO | WO2014103882 | A1 | | 1/2017 |
| WO | 2018141538 | A1 | | 8/2018 |

OTHER PUBLICATIONS

Office Action received for related Chinese Patent Application No. 2018800192188 dated Jul. 3, 2020 (8 pages).
English translation of the Office Action received for related Chinese Patent Application No. 2018800192188 dated Jul. 3, 2020 (11 pages).
Office Action received for related European Patent Application No. 18702120.9 dated Jul. 24, 2020 (4 pages).
Examination Report received for related Indian Patent Application No. 201947034411 dated Jul. 23, 2021 (6 pages).
International Search Report and Written Opinion received for related International Application No. PCT/EP2018/050873 dated Apr. 20, 2018 (12 pages).
Decision to Grant received for related Russian Application No. 2019124083/11 dated Jan. 15, 2018 (6 pages).
Translation of Chinese Application No. 205769308 published Dec. 7, 2016 (24 pages).
Translation of German Application No. 1155253 published Oct. 3, 1963 (6 pages).
Translation of German Application No. 4425598 published Dec. 21, 1995 (5 pages).
Translation of German U.S. Appl. No. 10/241,755 published Mar. 18, 2004 (9 pages).
Translation of Chinese Application No. 102167052 published Aug. 31, 2011 (4 pages).
Search Report and Opinion dated Jul. 5, 2022 for corresponding Brazilian application No. 112019016015-9 (4 pages).

* cited by examiner

RUNNING GEAR FOR A VEHICLE, AND BEARING ELEMENT FOR A RUNNING GEAR

RELATED APPLICATION

This is a National Stage filing of International Application No. PCT/EP2018/050873 filed Jan. 15, 2018 which claims priority to German Application No. 20 2017 100 568.2 filed Feb. 2, 2017.

FIELD OF THE INVENTION

The present invention relates to a running gear for a rail vehicle comprising a bogie and a brake linkage, with at least one bearing element wherein the brake linkage is mounted on the bogie and/or connected to the bogie by means of the at least one bearing element. The present invention furthermore relates to a bearing element for a running gear of a rail vehicle.

PRIOR ART

Running gears of rail vehicles generally comprise a bogie and a brake linkage. The brake linkage may furthermore comprise a so-called brake bridge. The brake linkage, in particular the brake bridge, is mounted on the bogie. Accordingly, the bogie may comprise an adapter which is arranged as a connector between the brake linkage or the brake bridge and the bogie. Furthermore, a suspension bracket may be provided with which the brake linkage, in particular the brake bridge, is connected to the bogie and mounted on the bogie.

High mechanical stress and electrical voltage occur in running gears of rail vehicles. Furthermore, strong vibration is expected in operation. The electrical voltages which build up between the bogie and the brake bridge or the brake linkage, respectively, may range from 10 kV to 100 kV and more. Due to the high weight of the bogie as well as the superstructures on the rail vehicle, forces of 100 kN and more may act on the connecting elements or bearing elements between the bogie and the brake linkage. The strong vibrations also cause the connections and mountings between the bogie and the brake linkage to age quickly so that short and frequent maintenance and inspection intervals must be adhered to.

DE 198 44 507 A1 provides a brake assembly for rail vehicles in which the brake bridge is spherically attached to a bogie by means of a flexible spherical joint mounting and wherein the flexible joint mounting comprises a rubber cuff.

DE 102 41 755 A1 provides a freight car bogie with reduced noise emission wherein bushings are used in the pin and bush couplings of the brake linkage for noise reduction purposes.

DE 44 25 598 C1 discloses a device for the automatic braking force determination at a standstill or during operation on brake disks of rail vehicles wherein a brake bridge is connected to a frame by means of a suspension bracket.

Prior art is also familiar with rubber-metal mountings used to mount a brake linkage on a bogie.

DESCRIPTION OF THE INVENTION: PROBLEM, SOLUTION, ADVANTAGES

The object of the present invention is to provide a running gear with a mounting of a brake linkage on a bogie wherein the mounting has a long service life and requires little maintenance. The transmission of shocks and vibrations between the brake linkage and the bogie is reduced, and the bogie and the brake linkage are electrically insulated from each other. Furthermore, the invention seeks to provide a bearing element for a running gear for a rail vehicle.

To achieve the object, a running gear for a rail vehicle comprising a bogie and a brake linkage is proposed, with at least one bearing element, wherein the brake linkage is mounted on the bogie by means of the at least one bearing element and/or wherein furthermore the at least one bearing element has a plastic and/or consists of a plastic.

The bogie may comprise an adapter and/or a suspension bracket to mount the brake linkage. Furthermore, the brake linkage may comprise a brake bridge wherein the mounting of the brake linkage is preferably achieved by means of the brake bridge.

Through the advantageous use of a bearing element having a plastic, preferably not vulcanized, in particular a hard plastic, and/or a bearing element consisting of a plastic, preferably not vulcanized, in particular a hard plastic, it is possible to provide a mount of a brake linkage on a bogie which offers good electrical insulation between the brake linkage and the bogie.

Tests performed by the applicant surprisingly showed that a bearing element from a plastic and/or comprising a plastic, advantageously influences a transfer of the braking forces to the bogie. Furthermore, it facilitates a reduction of shocks and vibrations to a degree that corresponds to the performance of known rubber/metal mountings for the mounting of brake linkages.

Preferably, the bearing element is not a rubber/metal mounting. Furthermore preferably, no rubber/metal mounting is provided for the mounting of the brake linkage on the bogie.

The bearing element comprising a plastic and/or consisting of a plastic in a running gear of a rail vehicle may be used as a general replacement of rubber/metal mountings in brake linkages with or without a suspension bracket. The electrically insulating bearing element having and/or consisting of a plastic is particularly suitable for the mounting of a pin for connecting a brake bridge with an adapter or for connecting a brake bridge with a bogie and/or with a suspension bracket.

Surprisingly, and with a particular advantage, service life tests showed a significantly longer service life of bearing elements having and/or consisting of a plastic in a running gear for a rail vehicle in comparison with known rubber/metal mountings.

Preferably the at least one bearing element is a bushing wherein the bearing element is arranged in the brake linkage, preferably in a hole, in particular a bore, of the brake linkage.

By forming the bearing element as a bushing and arranging the bearing element in a hole of the brake linkage, the bearing element may easily be used for the mounting of a brake linkage on a bogie of a rail vehicle without having to make any further modification on the brake linkage or the bogie.

It is furthermore preferred that a mounting means, in particular a pin, is arranged on the bogie and/or connected with the bogie and that the mounting means is mounted in the bearing element.

To mount or suspend the brake linkage, in particular a brake bridge, mounting means, in particular pins, are therefore arranged on the bogie, preferably on an adapter of the bogie and/or on a suspension bracket of the bogie which are, furthermore preferably, mounted and/or arranged in the bearing element. This provides a connection and mounting of a brake linkage with the bogie.

It is furthermore preferred that the brake linkage comprises a brake bridge wherein the brake bridge is mounted on the bogie by means of the at least one bearing element wherein the at least one bearing element is preferably arranged in the brake bridge, especially preferably in a hole, in particular in a bore, of the brake bridge.

By mounting the brake linkage by means of the brake bridge of the bogie, an effective and stabile mount is achieved. The brake linkage may be mounted on the bogie by means of the brake bridge. The mount may be provided exclusively by means of the brake bridge, but it is also possible that the brake linkage, in particular the brake bridge, is mounted by further mounts on the bogie, for example by a suspension bracket. If a further mount, for example by means of a suspension bracket, is provided, a bearing element comprising a plastic and/or consisting of a plastic may be used there as well. A further or additional mount of the brake linkage with the bogie may be provided as well by means of brake levers and/or the brake lining retainers.

It is especially preferred therefore that the brake bridge is fastened to and mounted on the bogie by means of an adapter and/or a suspension bracket provided for this purpose. Therefore, the brake bridge preferably has a hole, especially preferably a bore, in which the bearing element is arranged. Mounting means, in particular pins, are arranged on and/or fastened to the adapter and/or the suspension bracket, and the mounting means, in particular the pin or pins, are, in turn, arranged in the bearing element. Further mounting holders may be provided on the adapter and/or on the suspension bracket for the arrangement of the mounting means on the adapter and/or on the suspension bracket in which further bearing elements are arranged. The mounting means, in particular the pin or the pins, are, in particular at their ends, arranged in the suspension bracket and/or the adapter, preferably in the bearing elements arranged in the suspension bracket or the adapter. The suspension bracket and/or the adapter are connected to the bogie and/or are part of the bogie. In this manner, the elements braking bridge, hole, bearing element, pin, suspension bracket and/or adapter, and bogie mount the brake bridge with the bogie.

It may also be provided that at least one bearing element is arranged in a mounting holder of the adapter and/or of the suspension bracket as well so that a mounting holder of the suspension bracket and/or the adapter comprises a bearing element as well wherein the bearing element has a plastic and/or consists of a plastic.

It is furthermore preferred that the bogie is electrically insulated from the brake linkage by means of the at least one bearing element wherein the bearing element preferably comprises a dielectric strength of at least 20 kV, furthermore preferably of at least 40 kV, especially preferably of at least 50 kV, furthermore especially preferably of at least 60 kV, and even more preferably of at least 80 kV, and most preferably of at least 100 kV.

It is furthermore preferred that a bearing element has a dielectric strength between 20 kV and 200 kV, preferably between 50 kV and 150 kV, especially preferably between 80 kV and 120 kV, and most preferably of 100 kV.
The dielectric strength may be absolute or determined per millimeter material thickness of the bearing element. The high dielectric strengths lead to a good electrical insulation of the brake linkage against the bogie.

Furthermore, the electrical resistance of the bearing elements may preferably be greater than or equal to 2 kΩ, especially preferably measured at a 50 V test voltage after a voltage impulse of 2.5 kV in the microsecond range.

It is furthermore preferred that the bearing element may be arranged in the brake linkage and/or in the hole of the brake linkage, in particular the brake bridge, and/or the mounting holder of the adapter and/or the suspension bracket by being force-fit into a mounting means such as a pin.

It is furthermore possible as well that a metal part or a rubber part of a known rubber/metal mounting is replaced with a bearing element which has a plastic or consists of plastic.

It is furthermore preferred that the bearing element of the running gear for a rail vehicle is produced by means of a turning process. It is furthermore possible as well that the bearing element is produced by means of an extrusion process.

Preferably the bogie is vibration-damped against the brake linkage by means of the at least one bearing element wherein preferably a mounting property of the at least one bearing element is formed so that, in a service life test according to DIN EN 61 373, an acceleration density response of the brake linkage, in particular one mounted with the bearing element, is below 20,000 $(m/s^2)^2/Hz$, preferably below 10,000 $(m/s^2)^2/Hz$, and especially preferably below 9,000 $(m/s^2)^2/Hz$, across at least 50%, preferably at least 60%, furthermore preferably at least 80%, and most preferably at least 90%, of the frequency range from 10 Hz to 100 Hz.

To determine the mounting property of the at least one bearing element, a brake linkage with a brake bridge, with holes or bores being present in the brake bridge in which the bearing element is arranged, is inserted into a corresponding test device. During the service life test according to DIN EN 61 373, vibrations are transferred to the bearing element and/or the brake linkage and/or the brake bridge, and the acceleration density response of the brake linkage, in particular the brake bridge, is recorded by the sensors arranged on the brake linkage. By means of the sensors, the acceleration density response of the brake linkage is then applied in units of a power density by means of specified measured frequencies of the brake linkage, for example 0 Hz to 250 Hz. It may be provided here that, in particular in a frequency range from 10 to 100 Hz of the measured frequency spectrum of the brake linkage, the power density spectrum is below 20,000 $(m/s^2)^2/Hz$, preferably below 10,000 $(m/s^2)^2/Hz$, and most preferably below 9,000 $(m/s^2)^2/Hz$ in particular across at least 50%, preferably at least 60%, furthermore preferably at least 80%, and especially preferably at least 90% of the power density spectrum.

It is furthermore preferred that the plastic is polyoxymethylene (POM) and/or that the plastic is a self-lubricating plastic.

Polyoxymethylene (POM) is a highly molecular thermoplastic plastic and is characterized by high stability, hardness, and stiffness in a wide temperature range. Advantageously, it maintains its high viscosity to −40° and also has a high abrasion resistance and a low abrasion coefficient. Furthermore, polyoxymethylene is highly heat resistant and also has good gliding properties as well as good electric and dielectric characteristics. Furthermore, polyoxymethylene is characterized by a low water absorption so that temperatures of use of −40° to 130° are possible. POM may be combined with self-lubricating plastics.

It is furthermore preferred that the bearing element has a length from 30 mm to 200 mm, preferably from 50 mm to 100 mm, especially preferably from 50 mm to 60 mm, and/or an outer diameter from 30 mm to 100 mm, preferably from 40 mm to 70 mm, especially preferably from 50 mm to 65 mm, and/or an inner diameter from 25 mm to 90 mm, preferably from 35 mm to 75 mm, especially preferably from 50 mm to 55 mm, and/or a wall thickness from 1 mm to 6 mm, preferably from 2 mm to 5 mm, especially preferably from 3 mm to 4 mm, and most preferably of 3.5 mm.

It is furthermore preferred that the bearing element has a length from 30 mm to 200 mm preferably from 50 mm to 100 mm, especially preferably from 50 mm to 60 mm, and most preferably of 57 mm, and/or an outer diameter from 30 mm to 100 mm, preferably from 40 mm to 70 mm, especially preferably from 50 mm to 65 mm, and most preferably of 60 mm, and/or an inner diameter from 25 to 90 mm, preferably from 35 to 75 mm, especially preferably from 50 mm to 55 mm, and most preferably of 53 mm, and/or a wall thickness from 1 mm to 6 mm, preferably from 2 mm to 5 mm, especially preferably from 3 mm to 4 mm, and most preferably of 3.5 mm. The tolerances may range from 0.1 to 0.2 mm, especially preferred is the tolerance of 0.15 mm.

It may also be provided that a bearing element, especially a mounting disk, and furthermore especially a spacer, is provided.

The mounting end element, especially the mounting disk, serves to counteract a relaxation of the bearing element comprising a plastic or consisting of a plastic. If the bearing element is formed as a bushing and is arranged flush in a hole such as a bore of a brake bridge and if furthermore the brake linkage is mounted over the brake bridge and the bushing, it is possible under a strong load in operation that the plastic of the bushing is pressed out of the side of the bore in the brake bridge or flows out of it.

For this reason, a mounting end element such as a mounting disk or especially a spacer may be arranged at the end side on the bushing that is flush with the brake bridge, and the plastic of the bushing may be prevented from flowing out of or being pressed out of the bore by clamping the mounting end element between the brake bridge and the adapter or the suspension bracket of the bogie and thereby applying pressure. To this purpose, the bearing element or the mounting disk may have an inner opening through which the ends of the bolts that are used for the mounting and that are arranged in the bearing element, in particular the bushing, are guided.

The mounting end element, especially the mounting disk, may have a diameter ranging from 40 mm to 100 mm, preferably from 50 mm to 80 mm, especially preferably from 60 mm to 80 mm, and most preferably of 70 mm, and/or an opening diameter of the inner opening from 20 mm to 50 mm, preferably from 25 mm to 45 mm, especially preferably from 30 mm to 40 mm, and most preferably of 35 mm. The mounting end element, especially the mounting disk, may furthermore have a thickness from 1 mm to 5 mm, preferably from 2 mm to 4 mm, especially preferably from 2.5 mm to 3 mm.

A further solution of the object the invention is based on consists in the provision of a bearing element, especially a bushing, for a running gear, described above, wherein the bearing element has a plastic and/or consists of a plastic.

BRIEF DESCRIPTION OF THE DRAWINGS

The invention is explained below in further detail on the basis of the figures.

DETAILED DESCRIPTION OF THE DRAWINGS

Figure 1:
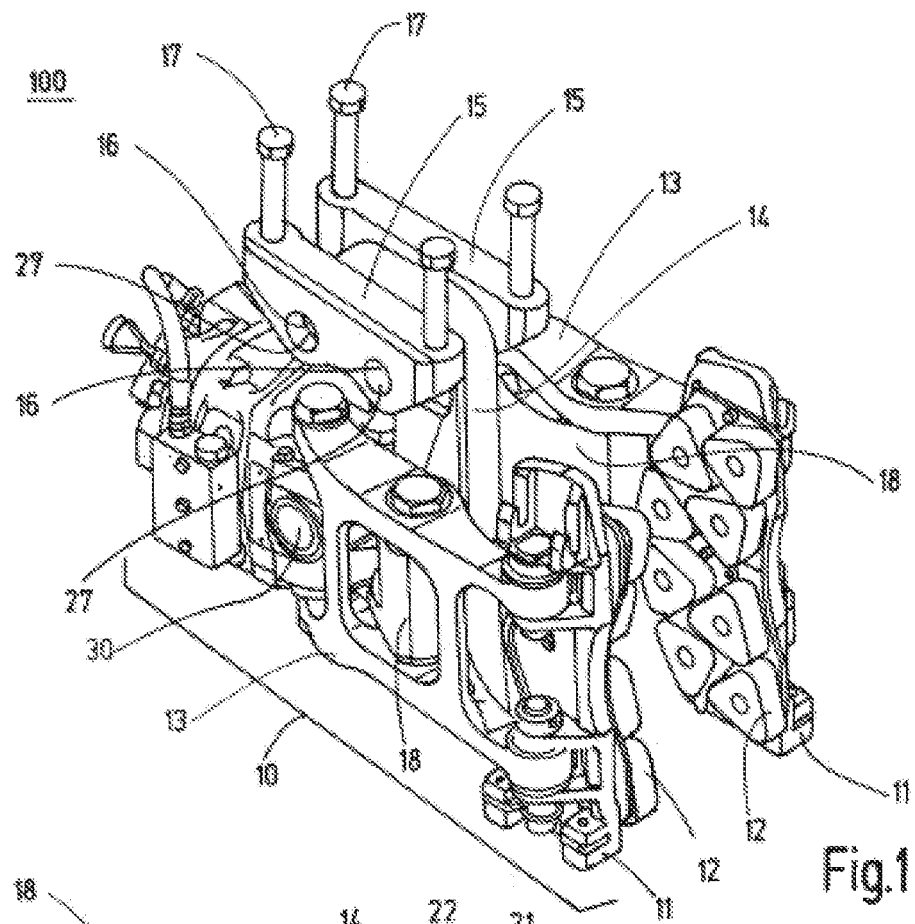
FIG. 1 shows a brake linkage with a brake bridge mounted on an adapter.

FIG. 1 shows a brake linkage 10 for a running gear 100 of a rail vehicle. The brake linkage 10 comprises brake lining retainers 11, brake linings 12, brake levers 13, as well as a brake bridge 14. FIG. 1 also shows an adapter 15 of a brake linkage, which is not specified in further detail. The brake bridge 14 is connected with the adapter 15 by means of pins 16 wherein the adapter 15, in turn, may be arranged on the bogie by means of fastening screws 17. The brake levers 13 are actuated by a brake cylinder 30.

Figure 2:
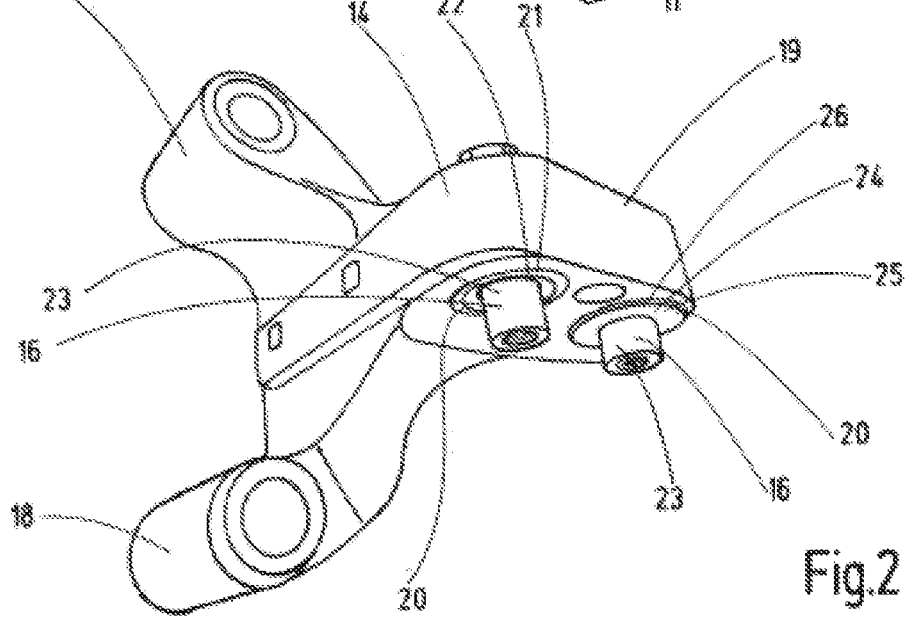
FIG. 2 shows a brake bridge with bushings.

FIG. 2 shows a perspective view of the brake bridge 14. The brake bridge 14 comprises two arms 18 for the fastening of the brake levers 13. Furthermore, a connection portion 19 is arranged in an upper portion of the brake bridge 14. The connection portion 19 comprises two through-bores 20. In each of the through-bores 20, a bearing element 22 made from a plastic is arranged as a bushing 21. Furthermore, a mounting means 23 is arranged in the bushing 21 in the form of a pin 16. The mounting 25 provided in FIG. 2 in the right portion of the connection portion 20 comprises, in addition to a bushing 21 and a pin 16, a mounting end element 26 from a plastic which is formed as a mounting disk 25. To mount the brake linkage 10, the pins 16, as shown in FIG. 1, may be arranged in mounting holders 27 of the adapter 15 wherein further bushings 21 may be found in the mounting holders 27 of the adapter 15. Furthermore, it is also possible that the pins 16 are directly connected with the bogie or mounted on the bogie. It is also possible that the pins 16 are arranged at the end side in suspension brackets of the bogie.

Figure 3:
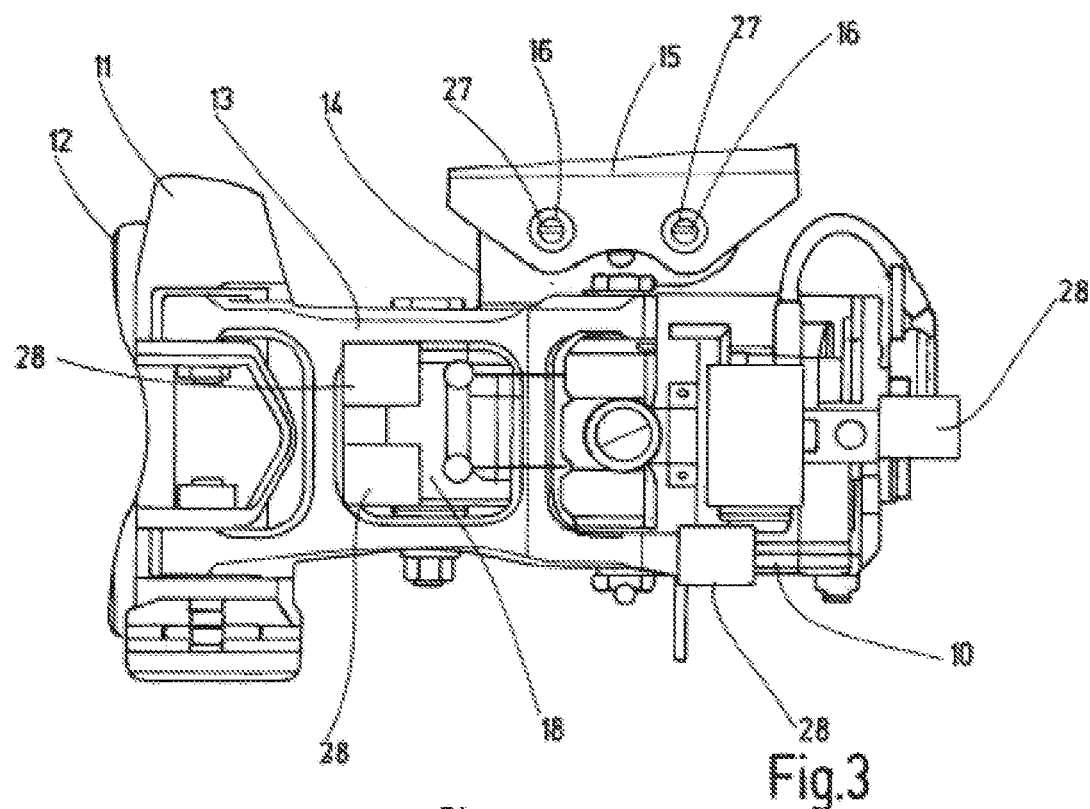
FIG. 3 shows a brake linkage with positions for sensors.

FIG. 3 shows a side view of a brake linkage 10 wherein especially the positions of the sensors 28 for the recording of an acceleration density response are shown.

Figure 4:
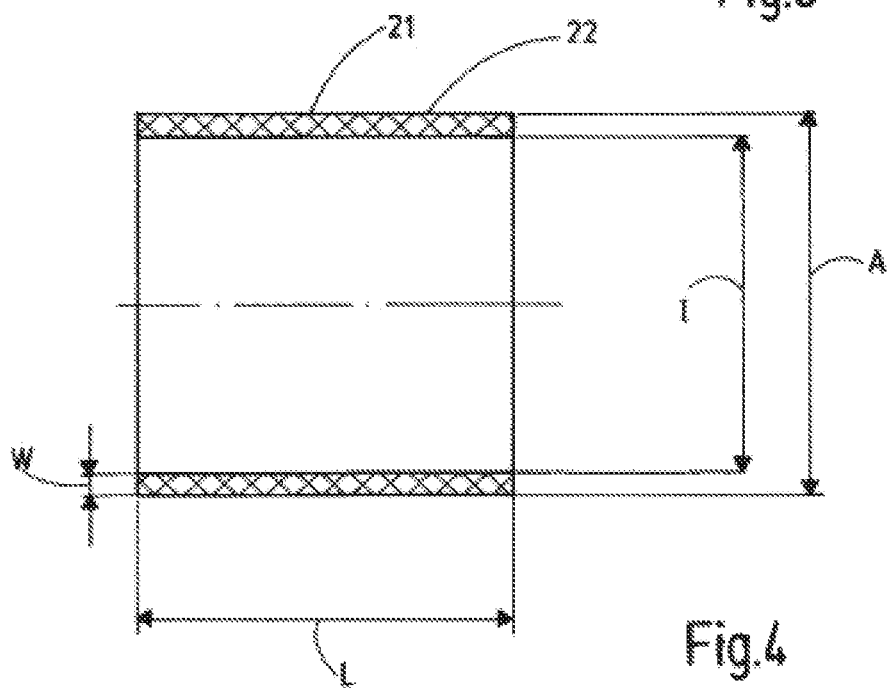
FIG. 4 shows a cross-sectional view of a bushing.

FIG. 4 shows a cross-section through a center plane of a bushing 21. The bushing 21 has a length L of 57 mm and an outer diameter A of 60 mm. Due to a wall thickness W of 3.5 mm, the inner diameter I of the bushing 21 is therefore 53 mm.

Figure 5:
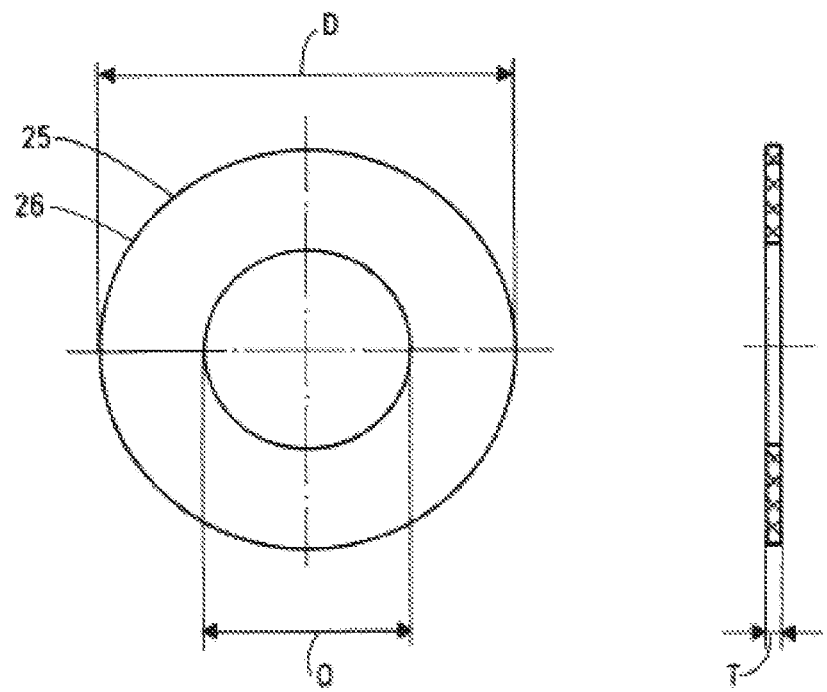
FIG. 5 shows a top view and a side view of a mounting disk.

FIG. 5 shows a top view of a mounting end element 26 formed as a mounting disk 25. The mounting disk 25 has a diameter D of 70 mm and an opening diameter O of the inner opening of 35 mm. Furthermore, the mounting disk has a thickness T of 2.5 mm.

Figure 6:
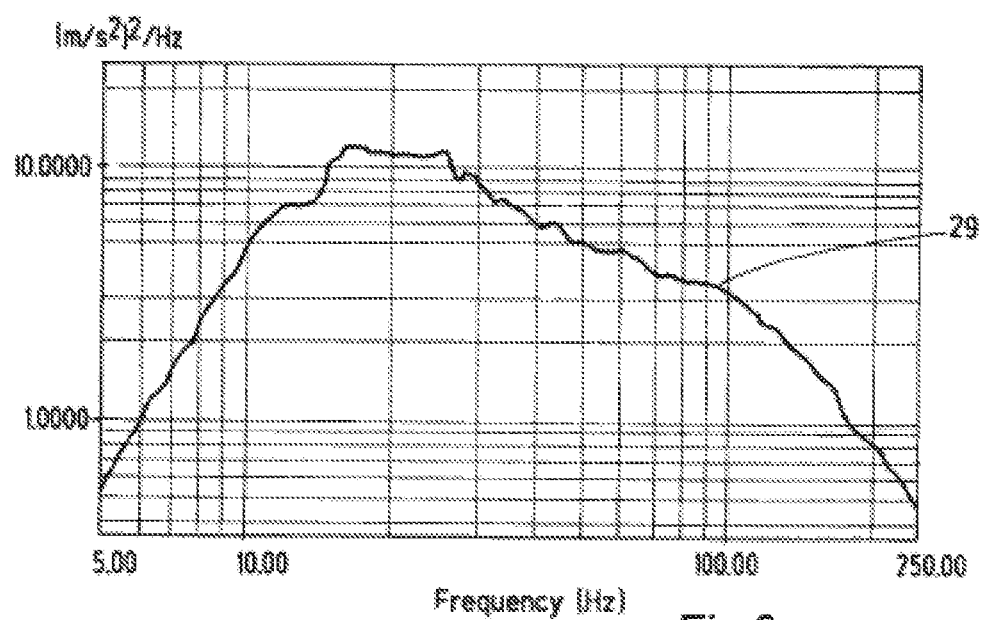
FIG. 6 shows a stylized power density spectrum.

FIG. 6 finally shows a stylized power density spectrum 29 of an acceleration density response recorded by the sensors 28. The X-axis shows the recorded frequency from 5 to 250 Hz, and the Y-axis shows the power density in units of $(m/s^2)^2/Hz$. Across at least 50% of the frequency range from 10 to 100 Hz, the power density spectrum is below 10,000 $(m/s^2)^2/Hz$.

The invention claimed is:
1. A running gear comprising:
 a bogie;
 a brake linkage
  one or more of mounted on the bogie or connected to the bogie by at least one bearing element, the brake linkage including a brake bridge mounted on the bogie by the at least one bearing element in the brake bridge, wherein the at least one bearing element is arranged in a bore of the brake bridge; and a mounting disk disposed at an end side of the at least one bearing element between the brake bridge and an adapter arranged as a connector between the brake linkage and the bogie, the mounting disk preventing the at least one bearing element from moving out of the bore in the brake bridge, wherein the at least one bearing element includes plastic.

2. The running gear of claim 1, wherein the at least one bearing element includes a bushing and is arranged in the brake linkage.

3. The running gear of claim 1, wherein a pin mounting means is one or more of arranged on or connected to the bogie and is mounted in the at least one bearing element.

4. The running gear of claim 1, wherein the brake bridge is mounted on the adapter by the at least one bearing element.

5. The running gear of claim 1, wherein the bogie is electrically insulated from the brake linkage by the at least one bearing element that has a dielectric strength of at least 20 kV.

6. The running gear of claim 1, wherein the bogie is vibration-damped over the brake linkage by the at least one bearing element, the brake linkage mounted with the at least one bearing element having an acceleration density response below 20,000 $(m/s^2)^2/Hz$ across at least 50% of a frequency spectrum from 10 hertz (Hz) to 100 Hz.

7. The running gear of claim 1, wherein the plastic is polyoxymethylene (POM).

8. The running gear of claim 1, wherein the at least one bearing element has one or more of a length from 30 millimeters (mm) to 200 mm, an outer diameter from 30 mm to 100 mm, an inner diameter from 25 mm to 90 mm, or a wall thickness from 1 mm to 6 mm.

9. The running gear of claim 2, wherein the at least one bearing element is a bushing.

10. The running gear of claim 5, wherein at least one the bearing element has a dielectric strength of at least 40 kilovolts (kV).

11. The running gear of claim 10, wherein the dielectric strength of the at least one bearing element is at least 60 kV.

12. The running gear of claim 11, wherein the dielectric strength of the at least one bearing element is at least 100 kV.

13. The running gear of claim 6, wherein the acceleration density response of the brake linkage is below 10,000 $(m/s^2)^2/Hz$.

14. The running gear of claim 6, wherein the acceleration density response of the brake linkage is below 9,000 $(m/s^2)^2/Hz$.

15. The running gear of claim 6, wherein the acceleration density response of the brake linkage is below 9,000 $(m/s^2)^2/Hz$, across at least 90% of the frequency spectrum from 10 Hz to 100 Hz.

16. The running gear of claim 8, wherein the at least one bearing element has one or more of the length from 50 mm to 60 mm, the outer diameter from 50 mm to 65 mm, the inner diameter from 50 mm to 55 mm, or the wall thickness from 3 mm to 4 mm.

17. The running gear of claim 1, wherein the mounting disk is a spacer.

18. A running gear for a vehicle, the running gear comprising:
   a bogie;
   a brake linkage having a brake bridge having a bore;
   a self-lubricating plastic bearing element disposed in the bore of the brake bridge and coupling the brake linkage to the bogie; and
   a mounting disk disposed at an end of the bearing element between the brake bridge and an adapter also connecting the brake linkage to the bogie, the mounting disk preventing flow of the bearing element out of the bore.

* * * * *